United States Patent
Fan et al.

(10) Patent No.: US 8,774,450 B2
(45) Date of Patent: Jul. 8, 2014

(54) UNAUTHORIZED TEXT ALTERATION PREVENTION WITH CONTOUR FOLLOWING BACKGROUND PATTERNS

(75) Inventors: Zhigang Fan, Webster, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 589 days.

(21) Appl. No.: 13/093,130

(22) Filed: Apr. 25, 2011

(65) Prior Publication Data

US 2012/0269433 A1  Oct. 25, 2012

(51) Int. Cl.
*G06K 9/48* (2006.01)

(52) U.S. Cl.
USPC .......................................... 382/100; 382/199

(58) Field of Classification Search
None
See application file for complete search history.

(56) References Cited

U.S. PATENT DOCUMENTS

| | | | | |
|---|---|---|---|---|
| 6,692,030 B1* | 2/2004 | Phillips | | 283/91 |
| 6,707,930 B2* | 3/2004 | Kalker et al. | | 382/100 |
| 7,613,363 B2* | 11/2009 | Platt et al. | | 382/299 |
| 7,626,743 B2* | 12/2009 | Ozawa | | 358/538 |
| 7,949,192 B2* | 5/2011 | Nagy | | 382/229 |
| 2004/0136565 A1* | 7/2004 | Hannigan et al. | | 382/100 |
| 2005/0063027 A1* | 3/2005 | Durst et al. | | 359/2 |
| 2009/0060262 A1* | 3/2009 | Wang | | 382/100 |
| 2009/0123085 A1* | 5/2009 | Yoshimura et al. | | 382/264 |
| 2011/0261427 A1* | 10/2011 | Hart et al. | | 359/22 |
| 2012/0269433 A1* | 10/2012 | Fan et al. | | 382/173 |

* cited by examiner

*Primary Examiner* — Tahmina Ansari
(74) *Attorney, Agent, or Firm* — Fay Sharpe LLP

(57) ABSTRACT

Described herein is a level I (overt) feature for security printing intended to deter unauthorized modification of text documents. The exemplary method includes generating a textured background that follows the contour of the text it surrounds and is difficult to modify. The background patterns may be generated with a two-step procedure that first creates a smooth function and then modulates it to produce patterns with sharp contrast. Tampering will be deterred as visible artifacts will be created when text is altered. Compared to the levels II and III features, the exemplary method relies on human vision for detection and does not require any special tools and instruments. It can be used in applications where fast, simple and inexpensive inspection is essential, or combined with other technologies for enhancing overall effectiveness.

25 Claims, 4 Drawing Sheets

UNAUTHORIZED TEXT ALTERATION PREVENTION WITH CONTOUR FOLLOWING BACKGROUND PATTERNS

BACKGROUND

The methods and systems disclosed herein are related to the art of digital image processing.

By way of background, the emerging digital printing technology is changing the dynamics of traditional security printing. Highly sophisticated and technologically advanced reprographic systems are no longer tools limited to the skilled technician but are now widely available to the general public. Ease of use and versatility, facilitated by user-friendly control panels, permit an unskilled user to make faithful full-color reproductions of many documents. Reproduction quality, ease of access, and relative freedom from discovery combine to create an atmosphere within which many individuals may experiment with forgery, tampering, unauthorized replication of sensitive documents, committing the so-called crime of opportunity. Furthermore, a low reproduction cost may encourage counterfeiting documents of relatively low value, such as tickets, merchandise packaging, coupons, and prescriptions.

Typical threats to a document include: (i) counterfeit/imitation; (ii) forgery; (iii) alteration; (iv) photo and/or signature substitution; and (v) counterfeit from cannibalized documents. Different security features fit different documents. Security features suitable for Passports, may differ for those suited for ID Cards, Driving Licenses, etc.

There are generally three levels of Physical Security Features. Level I includes security features are seen by the naked eyes (overt security features) such as: ID pictures, holograms, optical variable inks (OVI), thermo-chromic inks, metallic security threads, personalized shadows, and graphic designs (watermarks, deformation pattern, guilloche, intaglio, rainbow printing, etc.). Level II includes hidden security features authenticated by using simple devices (covert security features) such as a magnifying glass, a UV (ultraviolet) lamp, a two-dimensional (2D) barcode reader, a smart card reader, special simple lenses, and other electronic devices and biometric data verification. Typical measures include micro-text, UV and IR (infrared) inks, magnetic inks, tagged inks and toners. Level III includes hidden security features authenticated at a forensic laboratory level using special equipment.

Maintaining the integrity of a document and protecting it from unauthorized alteration is one of the topics that have recently drawn more attention. The watermarking-based method has been extensively studied for protecting pictorial images. The basic idea is to produce a compressed copy of the original image and embed it as digital watermarks into the image at a different location. By comparing the image and the digital watermarks, tampering can be detected. Similar methods can be applied to protect text documents. A duplicated version of the text information, with possible compression and coding is printed invisibly using the security printing technologies (e.g., infrared (IR) marks, UV marks, and/or microprints). If the counterfeiter modifies the text without changing its invisible duplication, it can be detected by comparing these two versions. These technologies belong to level III (covert) and II (assisted) features in security printing terminology. They are generally effective and reliable. However, their main disadvantage is they require additional detection equipment or tools.

The exemplary embodiments disclosed herein contemplate new and improved methods and systems that resolve the above-referenced difficulties and others.

BRIEF DESCRIPTION

Described herein is a level I (overt) feature for security printing intended to deter unauthorized modification of text documents. The exemplary method includes generating a textured background that follows the contour of the text it surrounds and is difficult to modify. The background patterns may be generated with a two-step procedure that first creates a smooth function and then modulates it to produce patterns with sharp contrast. Tampering will be deterred as visible artifacts will be created when text is altered. Compared to the levels II and III features, the exemplary method relies on human vision for detection and does not require any special tools and instruments. It can be used in applications where fast, simple and inexpensive inspection is essential, or combined with other technologies for enhancing overall effectiveness.

In one embodiment a method of processing images with an image processing system is provided. The method includes: (a) receiving data for a portion of a document that is to be protected via a controller, wherein the document includes a foreground section and a background section; (b) creating a smooth function in the background of the document, wherein the smooth function has a constant or slowing varying value at each edge pixel on a border between the background and the foreground; and (c) modulating the smooth function to generate at least one new security background pattern with strong contrasts.

In another embodiment an image processing system is provided. The image processing system includes a controller that (a) receives data for a portion of a document that is to be protected via a controller, wherein the document includes a foreground section and a background section; (b) creates a smooth function in the background of the document, wherein the smooth function has a constant or slowing varying value at each edge pixel on a border between the background and the foreground; and (c) modulates the smooth function to generate at least one new security background pattern with strong contrasts.

In yet another embodiment a computer program product is provided. The computer program product includes a non-transitory computer-usable data carrier storing instructions that, when executed by a computer, cause the computer to perform a method comprising: (a) receiving data for a portion of a document that is to be protected via a controller, wherein the document includes a foreground section and a background section; (b) creating a smooth function in the background of the document, wherein the smooth function has a constant or slowing varying value at each edge pixel on a border between the background and the foreground; and (c) modulating the smooth function to generate at least one new security background pattern with strong contrasts.

DETAILED DESCRIPTION

Aspects of the exemplary embodiment relate to an image processing system, which includes operational components that allow a user to generate and/or copy documents. The image processing system may comprise an image rendering device in which the operations may include two or more of printing, copying, faxing, scanning, scan to email, and the like. Each of the operations may be user-selectable via an appropriate local user interface (UI) located proximate the image processing system, which allows contemporaneous user interaction with the image processing system by respective users.

As used herein, the term "data" refers generally to physical signals that indicate or include information. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. An image can be digital, where the various forms of pixel values (i.e., bit, gray scale value, etc.) are numerical values, or an image can be physical, such as colorants printed on a page, where pixel values are amounts of colorants at respective pixel locations. An operation typically performs "image processing" when it operates on an item of data that relates to part of an image.

Figure 1:
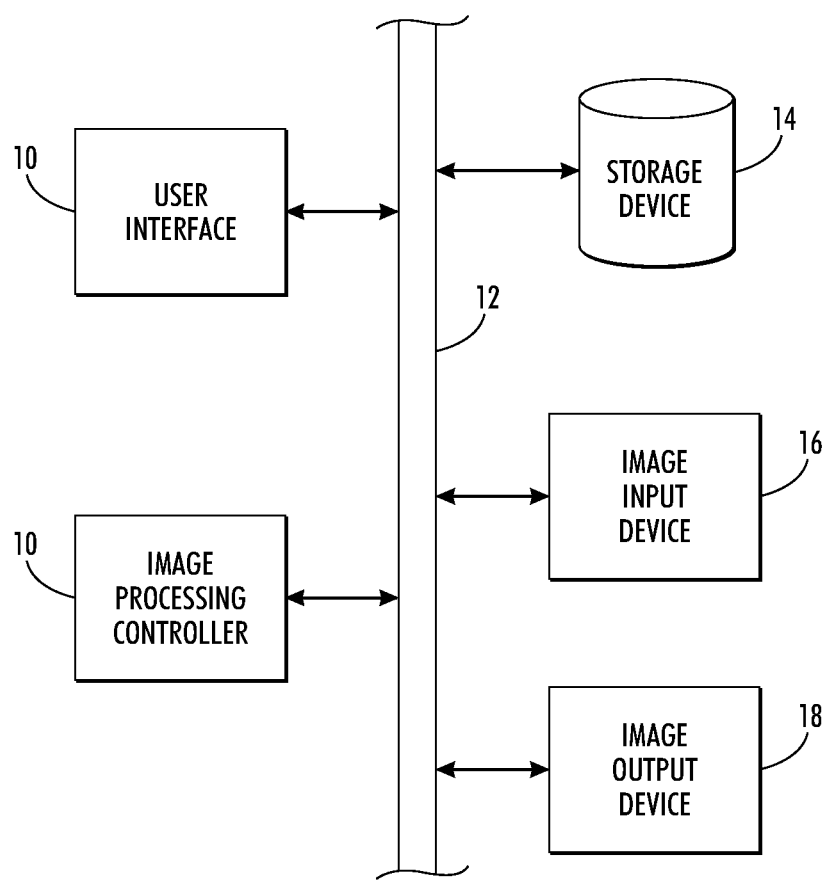
FIG. 1 is a block diagram of an image processing system adapted to implement aspects of the exemplary embodiments.

FIG. 1 illustrates a block diagram of an exemplary environment in which an image processing system 2 in accordance with the exemplary embodiment operates. Exemplary operations include image processing operations, such as scanning, copying, faxing, and printing. Image processing operations generally involve the processing of jobs, such as print jobs, copy jobs, or fax jobs As shown in FIG. 1, an image processing controller 10 is connected via a communication connection (wired or wireless) 12 to a document storage device (or memory) 14. The image processing controller 10 may also be associated with an image input device 16. An "image input device" is a device that can receive an image and provide an item of data defining a version of the image. A "scanner" is a type of image input device that receives an image by a scanning operation, such as by scanning a document.

The image processing controller 10 may be associated with an image data output device 18. An "image output device" is a device that can receive an item of data defining an image and provide or render the image as output, such as a printer. Further, a "display" is a type of image output device that provides the output image in human viewable form.

The image processing controller 10 may be hosted by the image processing system's control system (not shown), often referred to as a digital front end (DFE). The image processing controller 10 is capable of receiving the adjusted image data and supplying image data to the image data output device 18. For example, the image processing controller 10 may be a computer, a microprocessor, a scanner processor, a network server, a print server, photocopying device and/or any other known or later developed device or system that is able to receive and provide image data. The image processing controller 10 may include a plurality of components including displays, user interfaces, memory, disk drives, tape drives, hard disks, flash drives, zip drives, CD-ROM drives, DVD drives, and the like.

The image output device 18 is any type of device that is capable of outputting an image. For example, the image output device 18 may be a laser printer, bubble jet printer, ink jet printer, photocopying machine, or any other known or later developed device or system that is able to generate an image on a recording medium or display an image using image data or data generated from the image data. The image output device 18 generates an image based on the adjusted image data from the image processing controller 10. While FIG. 1 shows a single image output device 18, multiple image output devices 18 may be coupled to the image processing controller 10.

It will be appreciated that the UI 20 may be mounted directly on the image processing system 2 or proximate thereto in any convenient location to be accessed by walk up users of the image processing system 2. The UI 20 may be manually operable for entering user selections. For example, the UI 20 may each include a display, such as a LCD display, and a user input device, such as a touch screen, keyboard, or the like, by which a user inputs a selection.

The image input device 16 performs a scanning function and may be used in performing operations such as scanning, copying and faxing. In particular, the image input device 16 acquires a digital image of an original hardcopy document, which image may be stored and optionally further processed by other operational components of the image processing system 2. A copying operation may be performed by a combination of scanning and printing operations.

As will be appreciated, other operational components of the image processing system 2, which are not illustrated in FIG. 1 for convenience, may include a print media source, such as a high speed paper feeder, a finisher which receives printed sheets from the printer, and a print media conveyor system, which conveys the paper from the paper source to the printer and finisher in turn.

The processing steps that will be described herein may take place either on the image processing controller 10 or at a dedicated server or processor associated with the storage device 14. As another alternative, the processing described may take place within the image input device 16, or at the image output device 18, if they are equipped with the appropriate processors. This may well be the case in the situation of a multi-function device (MFD), which is equivalent to the computer/scanner/printer combination described herein.

The storage device 14 may represent any type of computer readable medium such as random access memory (RAM), read only memory (ROM), magnetic disk or tape, optical disk, flash memory, or holographic memory. In one embodiment, the storage device 14 comprises a combination of random access memory and read only memory. In some embodiments, the processing component 10 and the storage device 14 may be combined in a single chip.

Critical information, such as the date in a ticket or the dollar amount in a coupon or in a check, is often printed as text in a document. By using modern scanners/printers/MFDs and software tools such as Photoshop and the like, documents can be reproduced with text being altered by a person with reasonable computer skills. The possible forms for tampering include, but are not limited to, deletion, insertion and replacement. Deletion can be simply performed by replacing the text pixels with background colors. To produce text without knowing detailed font information may not be straightforward. However, insertion can often be achieved by copying and pasting the existing text of the same font in the document. Replacement is just a combination of deletion and insertion. Applying a background with texture such as tint or line patterns during document generation makes tampering more difficult, since the blank left by removing existing text needs to be filled with background texture. Nevertheless, the texture of regular patterns can be relatively easily generated by graphical tools or copied from other parts of the document.

The background pattern described herein is spatially varying and follows the text contour it surrounds. Any changes in the text without extensively modifying the background pattern would cause artifacts that are readily visible without the need for detection equipment. The patterns are complex in shape and difficult to modify. They are also irregular and not repeating and therefore difficult to be copied from other parts of the document.

Figure 2:
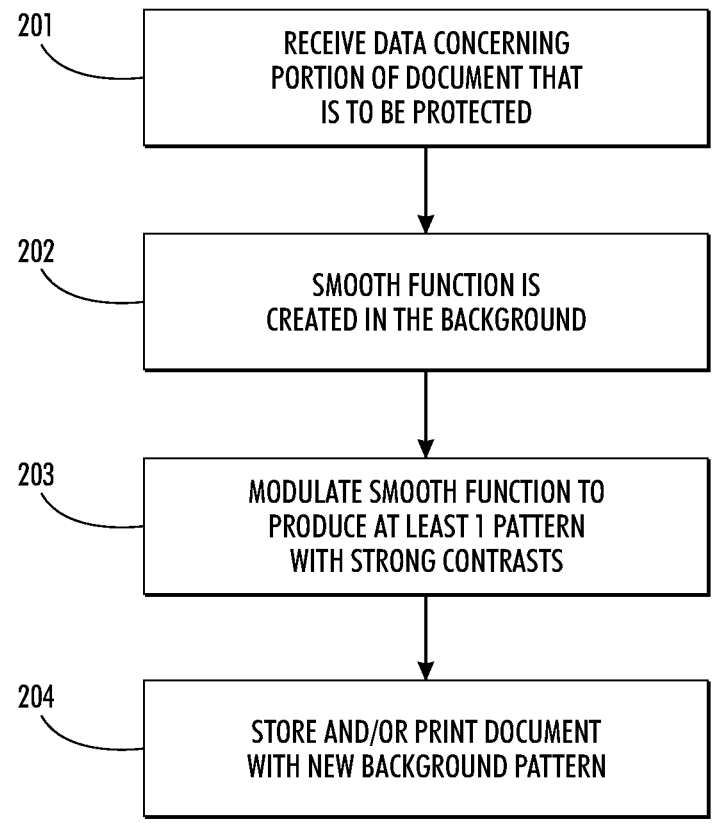
FIG. 2 is a flow chart of an exemplary method of securing documents.

With reference now to FIG. 2, a flow chart of the exemplary method is shown. Initially, a suitable controller, such as the image processing controller 10 of the image processing system 2, receives data concerning a portion of the document that is to be protected (201). In this regard, the document generally includes a foreground section and a background section. For example, a user may use the UI of the image processing system 2 to highlight a portion (some or all) of the document or to specify a region (some or all) of the document. The portion of the document that is to be protected may contain one or more types of text and/or images and generally includes one or more types of critical and/or sensitive information, such as a serial number, the date in a ticket, or the dollar amount in a coupon or in a check. It is to be understood, however, that this is not an exhaustive list and that other types and/or forms of information may be protected.

Next, a new security background pattern is generated in a two-step process. First, a smooth function is created in the background section of the document (202). The smooth function has a constant or slowing varying value at each edge pixel on the text/background border. This step ensures that the resulting security background patterns are globally coherent and following the text and/or image contours. Next, the smooth function is modulated to produce at least one security background pattern with, for example, strong contrasts (203). This step helps to make the new security background pattern complex, difficult to regenerate and easily visible when altered. Finally, the document with the new security background pattern may be stored in the database 14 and/or printed by the image output device 18 (204).

Figure 3:
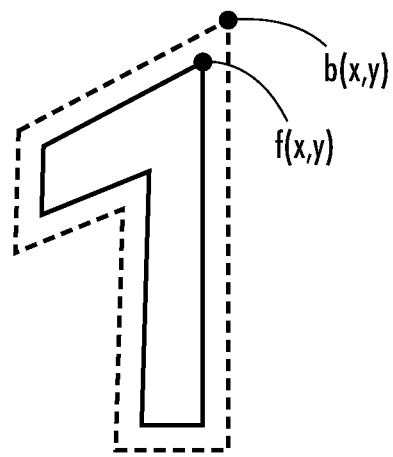
FIG. 3 shows a portion of an image that is to be protected in accordance with aspects of the exemplary embodiments.

With reference to FIGS. 2 and 3, the smooth function generated in step 202 may be represented as:

$$F(x,y)=(|x|+|y|)^{0.3}d^2(x,y), \quad (1)$$

where d(x, y) is the geometric distance between a background pixel b(x, y) and its closest foreground pixel f($x_1$, $y_1$).

The function is modulated in step 204 as:

$$v(x,y)=[0.1F(x,y)]\% \, 256. \quad (2)$$

Figure 4:
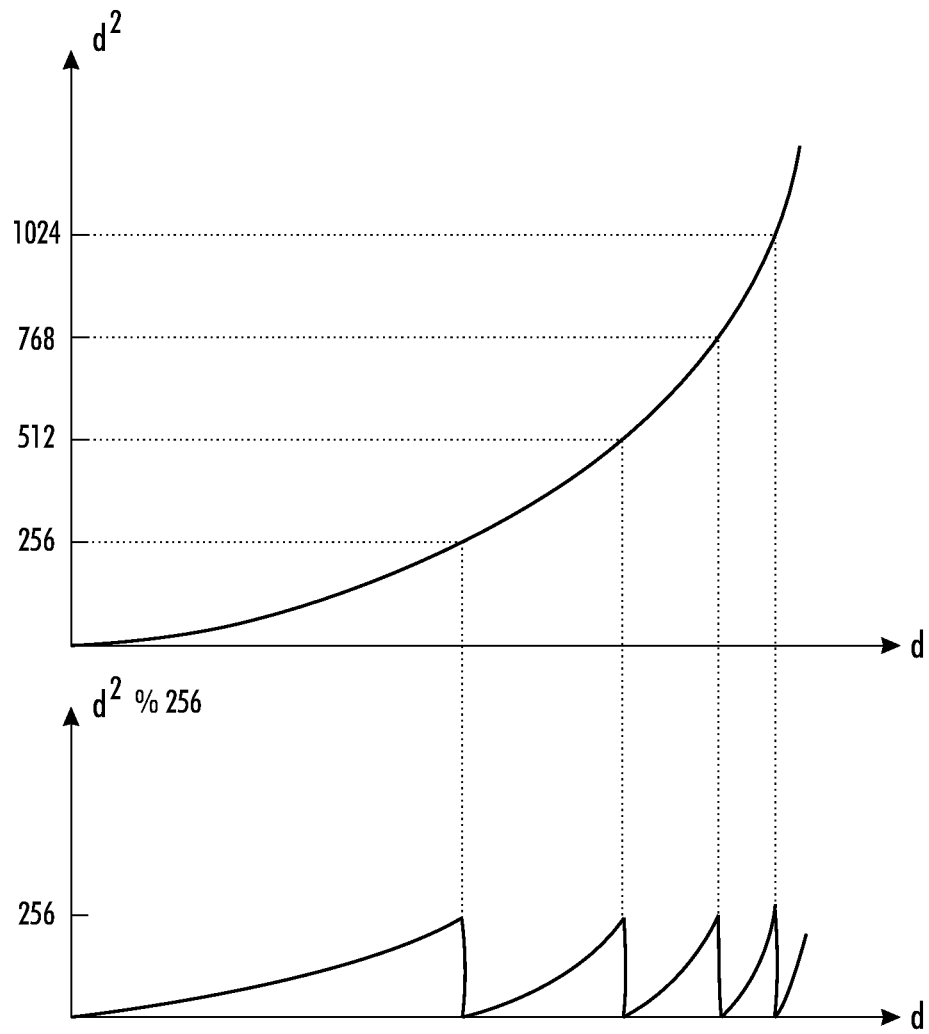
FIG. 4 shows a pair of graphs in accordance with aspects of the exemplary method.

FIG. 4 provides an example for explaining Box 203 of FIG. 2, i.e., "the smooth function is modulated to produce at least one pattern with strong contrasts." In this example, a smooth function d2 becomes a pattern with strong contrasts after it is modulated. The function returns the remainder divided by 256.

Figure 5:
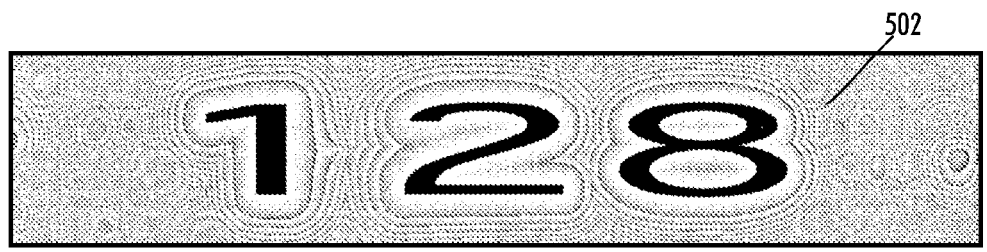
FIG. 5 is an example of a security background pattern for an image that is to be secured as generated by the exemplary method.
Figure 6:
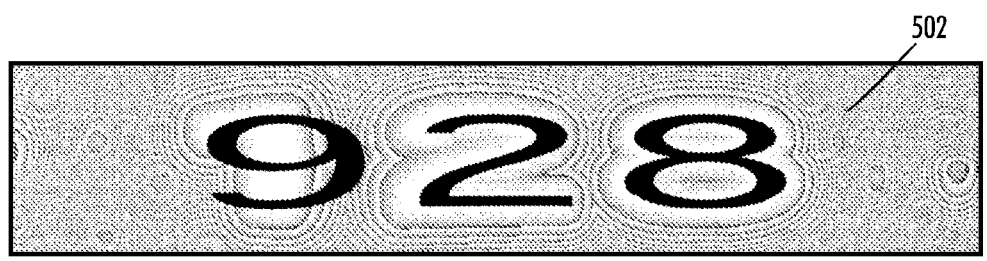
FIG. 6 illustrates an attempt to alter the image on the document shown in FIG. 5 without altering the security background pattern.
Figure 7:
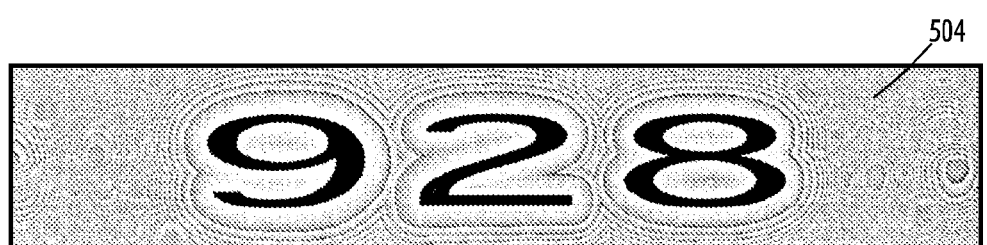
FIG. 7 illustrates an altered image and security background pattern.

An example of a new security background pattern 502 generated by the exemplary method is shown in FIG. 5. In this example, the number sequence "128" is surrounded by the new security background pattern 502. FIG. 6 mimics an attempt to alter the text (e.g., change "128" to "928") without modifying the background 502 accordingly. It is obvious that the character "9" does not fit the background. In contrast, FIG. 7 is the image produced in the "correct" manner, with an altered background pattern 504 that matches the number "928". A comparison between FIGS. 6 and 7 also shows that a significant editing effort is required if the image shown in FIG. 6 is to be converted to the image shown in FIG. 7 (unless the functions are known).

Figure 8:
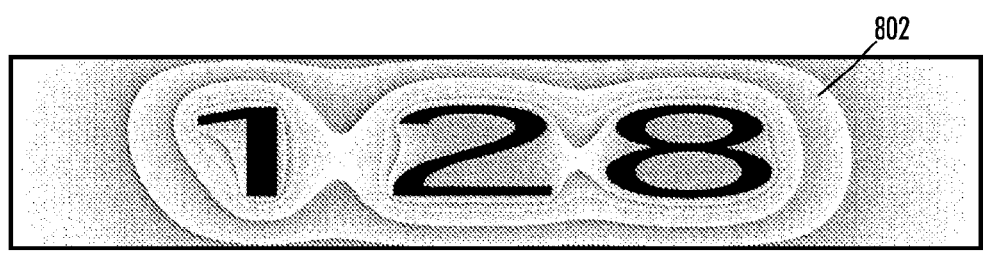
FIG. 8 illustrates an alternative security background pattern generated by an alternative method.

An alternative background pattern 802 for the number "128" is shown in FIG. 8. The smooth function here is the solution of a two-dimensional Laplace's equation $\Delta u=0$, with boundary conditions setting to u(x, y)=255 for each edge pixel (x, y), and 0 for each pixel at the image border. The conversion in the second step is performed as:

$$v(x,y)=[10u(x,y)^{0.4}]\% \, 255. \quad (3)$$

The exemplary tampering deterrence method described herein uses contour following background patterns. The new security background patterns are generated with a two-step procedure that first creates a smooth function and then modulates it to produce patterns with sharp contrasts. The new security background patterns follow the text contours and are difficult to re-generate without the detailed knowledge of the generation parameters. Unauthorized alteration of text is deterred as it becomes readily visible. It would thus be difficult for a non-expert to circumvent the security system, and the method is therefore very effective in deterring amateur counterfeiters. In addition, it may also prevent professionals from doing so, as it alters their cost/benefit calculations. The exemplary method is useful for applications where fast/simple/inexpensive inspection is essential. It can also be combined with other technologies for enhancing overall reliability.

The methods described above may be implemented in a non-transitory computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is, in turn, capable of implementing the flowchart shown in FIG. 2, can be used to implement the method for operating an image processing system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of processing images with an image processing system, the method comprising:
   receiving data for a portion of a document that is to be protected via a controller, wherein the document includes a foreground section and a background section, and wherein the foreground section includes one or more types of text or images;
   creating a smooth function in the background section of the document, wherein the smooth function has a constant or slowing varying value at a plurality of edge pixels on a border between the background and the foreground; and
   modulating the smooth function to generate at least one new overt security background pattern with strong contrasts that is spatially varying and follows the border it surrounds.

2. The method of claim 1, further comprising:
   storing the document with the new overt security background pattern in a storage device.

3. The method of claim 1, further comprising:
   printing the document with the new overt security background pattern via an image output.

4. The method of claim 1, wherein the smooth function is represented as:

$$F(x,y)=(|x|+|y|)^{0.3}d^2(x,y),$$

where d(x, y) is the geometrical distance between a background pixel b(x, y) and its closest foreground pixel f($x_1$, $y_1$).

5. The method of claim 4, wherein the smooth function is modulated as:

$$v(x,y)=[0.1F(x,y)]\% \ 256.$$

6. The method of claim 1, wherein the smooth function is the solution of a two-dimensional Laplace's equation $\Delta u=0$, with boundary conditions setting to u(x, y)=255 for each edge pixel (x, y), and 0 for each pixel at the image border.

7. The method of claim 6, wherein the smooth function is modulated as:

$$v(x,y)=[10u(x,y)^{0.4}]\% \ 255.$$

8. An image processing system comprising: a controller that receives data for a portion of a document that is to be protected via a controller, wherein the document includes a foreground section and a background section, and wherein the foreground section includes one or more types of text or images; creates a smooth function in the background of the document, wherein the smooth function has a constant or slowing varying value at each at a plurality of edge pixels on a border between the background and the foreground; and modulates the smooth function to generate at least one new overt security background pattern with strong contrasts that is spatially varying and follows the text contour it surrounds.

9. The system of claim 8, further comprising:
   a storage device that stores the document with the new overt security background pattern.

10. The method of claim 8, further comprising:
    an image output device that prints the document with the new overt security background pattern.

11. The system of claim 8, wherein the smooth function is represented as:

$$F(x,y)=(|x|+|y|)^{0.3}d^2(x,y),$$

where d(x, y) is the geometrical distance between a background pixel b(x, y) and its closest foreground pixel f($x_1$, $y_1$).

12. The system of claim 11, wherein the smooth function is modulated as:

$$v(x,y)=[0.1F(x,y)]\% \ 256.$$

13. The system of claim 8, wherein the smooth function is the solution of a two-dimensional Laplace's equation $\Delta u=0$, with boundary conditions setting to u(x, y)=255 for each edge pixel (x, y), and 0 for each pixel at the image border.

14. The system of claim 13, wherein the smooth function is modulated as:

$$v(x,y)=[10u(x,y)^{0.4}]\% \ 255.$$

15. A computer program product comprising:
    a non-transitory computer-usable data carrier storing instructions that, when executed by a computer, cause the computer to perform a method comprising:
    receiving data for a portion of a document that is to be protected via a controller, wherein the document includes a foreground section and a background section, and wherein the foreground section includes one or more types of text or images;
    creating a smooth function in the background of the document, wherein the smooth function has a constant or slowing varying value at a plurality of edge pixels on a border between the background and the foreground; and
    modulating the smooth function to generate at least one new overt security background pattern with strong contrasts that is spatially varying and follows the text contour it surrounds.

16. The product of claim 15, wherein the method further comprises:
    storing the document with the new overt security background pattern in a storage device.

17. The product of claim 15, wherein the method further comprises:
    printing the document with the new overt security background pattern via an image output device.

18. The product of claim 17, wherein the smooth function is represented as:

$$F(x,y)=(|x|+|y|)^{0.3}d^2(x,y),$$

where d(x, y) is the geometrical distance between a background pixel b(x, y) and its closest foreground pixel f($x_1$, $y_1$).

19. The product of claim 18, wherein the smooth function is modulated as:

$$v(x,y)=[0.1F(x,y)]\% \ 256.$$

20. The product of claim 19, wherein the smooth function is the solution of a two-dimensional Laplace's equation $\Delta u=0$, with boundary conditions setting to u(x, y)=255 for each edge pixel (x, y), and 0 for each pixel at the image border and the smooth function is modulated as:

$$v(x,y)=[10u(x,y)^{0.4}]\% \ 255.$$

21. A method of processing images with an image processing system, the method comprising:

receiving data for a portion of a document that is to be protected via a controller, wherein the document includes a foreground section and a background section;

creating a smooth function in the background of the document, wherein the smooth function has a constant or slowing varying value at a plurality of edge pixels on a border between the background and the foreground;

modulating the smooth function to generate at least one new security background pattern with strong contrasts, wherein the smooth function is represented as:

$$F(x,y)=(|x|+|y|)^{0.3}d^2(x,y),$$

where $d(x, y)$ is the geometrical distance between a background pixel $b(x, y)$ and its closest foreground pixel $f(x_1, y_1)$.

22. The method of claim 21, wherein the smooth function is modulated as:

$$v(x,y)=[0.1F(x,y)]\% \, 256.$$

23. The method of claim 21, further comprising:

storing the document with the new background pattern in a storage device, wherein the new background pattern surrounds a text counter and is spatially varying and follows the text contour;

printing the document with the new background pattern via an image output.

24. A method of processing images with an image processing system, the method comprising:

receiving data for a portion of a document that is to be protected via a controller, wherein the document includes a foreground section and a background section;

creating a smooth function in the background of the document, wherein the smooth function has a constant or slowing varying value at a plurality of edge pixels on a border between the background and the foreground;

modulating the smooth function to generate at least one new security background pattern with strong contrasts, wherein the smooth function is the solution of a two-dimensional Laplace's equation $\Delta u=0$, with boundary conditions setting to $u(x, y)=255$ for each edge pixel $(x, y)$, and 0 for each pixel at the image border.

25. The system of claim 24, wherein the smooth function is modulated as:

$$v(x,y)=[10u(x,y)^{0.4}]\% \, 255.$$

* * * * *